(12) United States Patent
Aono et al.

(10) Patent No.: US 12,552,188 B2
(45) Date of Patent: Feb. 17, 2026

(54) INKJET PRINTER SYSTEM

(71) Applicant: Hitachi Industrial Equipment Systems Co., Ltd., Tokyo (JP)

(72) Inventors: Masahiro Aono, Tokyo (JP); Keisuke Okawa, Tokyo (JP); Vong Vuthea, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 315 days.

(21) Appl. No.: 18/279,979

(22) PCT Filed: Mar. 1, 2022

(86) PCT No.: PCT/JP2022/008616
§ 371 (c)(1),
(2) Date: Sep. 1, 2023

(87) PCT Pub. No.: WO2022/186204
PCT Pub. Date: Sep. 9, 2022

(65) Prior Publication Data
US 2024/0149598 A1    May 9, 2024

(30) Foreign Application Priority Data
Mar. 5, 2021    (JP) ................................. 2021-035305

(51) Int. Cl.
*B41J 29/393* (2006.01)
*B41J 2/505* (2006.01)
*G06F 30/27* (2020.01)

(52) U.S. Cl.
CPC ........... *B41J 29/393* (2013.01); *B41J 2/5056* (2013.01); *B41J 2203/01* (2020.08); *G06F 30/27* (2020.01)

(58) Field of Classification Search
None
See application file for complete search history.

(56) References Cited

U.S. PATENT DOCUMENTS 5,822,451 A * 10/1998 Spaulding ................ H04N 1/52
382/270
7,014,289 B1 * 3/2006 Matsuda ................ B41J 29/393
347/19

(Continued)

FOREIGN PATENT DOCUMENTS

| CN | 110667258 A | 1/2020 |
| JP | 11-198360 A | 7/1999 |

(Continued)

OTHER PUBLICATIONS

International Search Report (PCT/ISA/210) issued in PCT Application No. PCT/JP2022/008616 dated May 24, 2022 with English translation (5 pages).

(Continued)

*Primary Examiner* — Helen Zong
(74) *Attorney, Agent, or Firm* — Crowell & Moring LLP

(57) ABSTRACT

Provided is a novel inkjet printer system that can use machine learning to improve the inspection performance of a printing inspection device. The inkjet printer system includes, in the machine learning, a random test printing function unit (301) that has a function that prints a random dot arrangement that is based on various characters printed in the printing area of a printing target, and an evaluation function training function unit (302) that has a function that optimizes an evaluation function for inspecting a printed image on the basis of a captured image of the results of the printing.

7 Claims, 9 Drawing Sheets

(56) References Cited

U.S. PATENT DOCUMENTS

| | | | |
|---|---|---|---|
| 2007/0229574 A1 | 10/2007 | Kaneko et al. | |
| 2015/0251411 A1* | 9/2015 | Rossell | B41J 11/46 358/1.9 |
| 2017/0190194 A1* | 7/2017 | Zollner | B41J 2/2146 |
| 2020/0410655 A1 | 12/2020 | Imamura et al. | |
| 2024/0087344 A1* | 3/2024 | Li | G06V 10/82 |

FOREIGN PATENT DOCUMENTS

| | | |
|---|---|---|
| JP | 2007-281723 A | 10/2007 |
| JP | 2016-185688 A | 10/2016 |
| JP | 2020-26057 A | 2/2020 |
| JP | 2020-189425 A | 11/2020 |
| JP | 2021-5266 A | 1/2021 |
| JP | 2021-24153 A | 2/2021 |

OTHER PUBLICATIONS

Japanese-language Written Opinion (PCT/ISA/237) issued in PCT Application No. PCT/JP2022/008616 dated May 24, 2022 with English translation (6 pages).
Chinese-language Office Action issued in Chinese Application No. 202280019239.6 dated May 28, 2025, with partial English translation (13 pages).

* cited by examiner

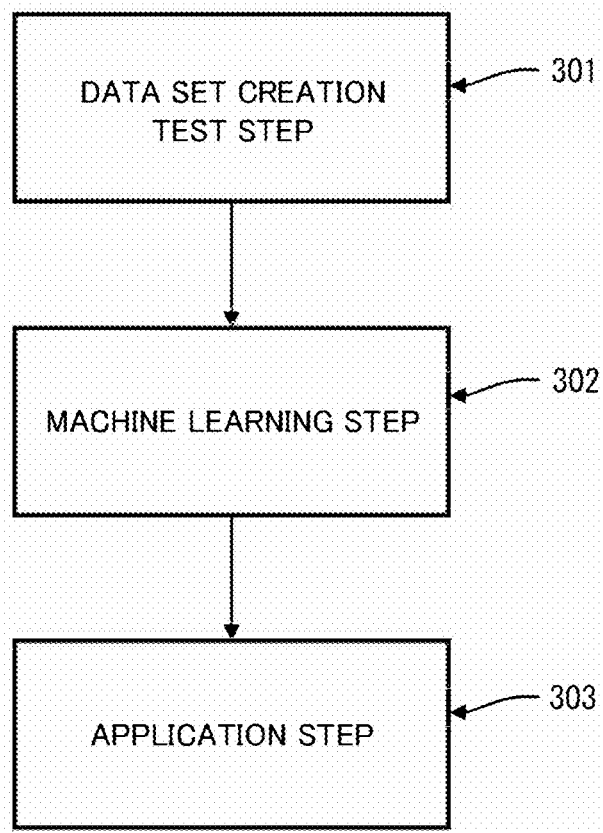

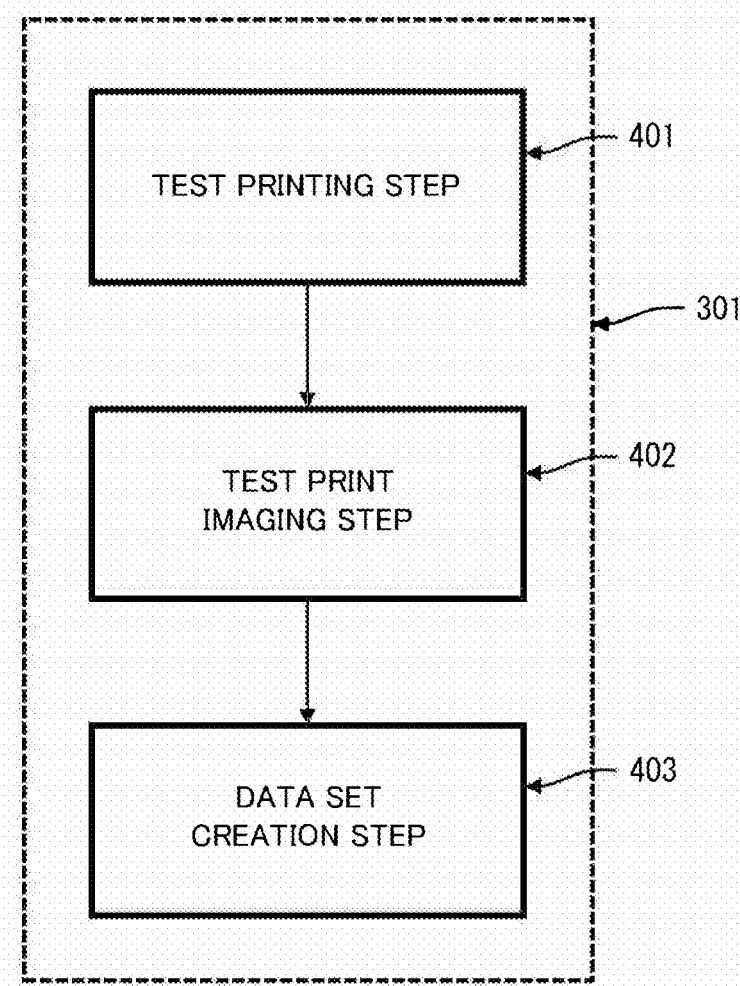

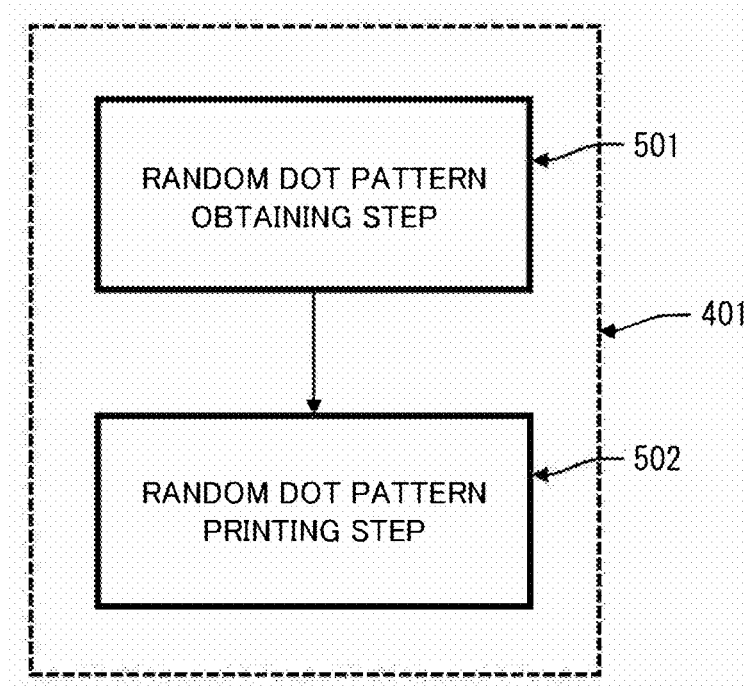

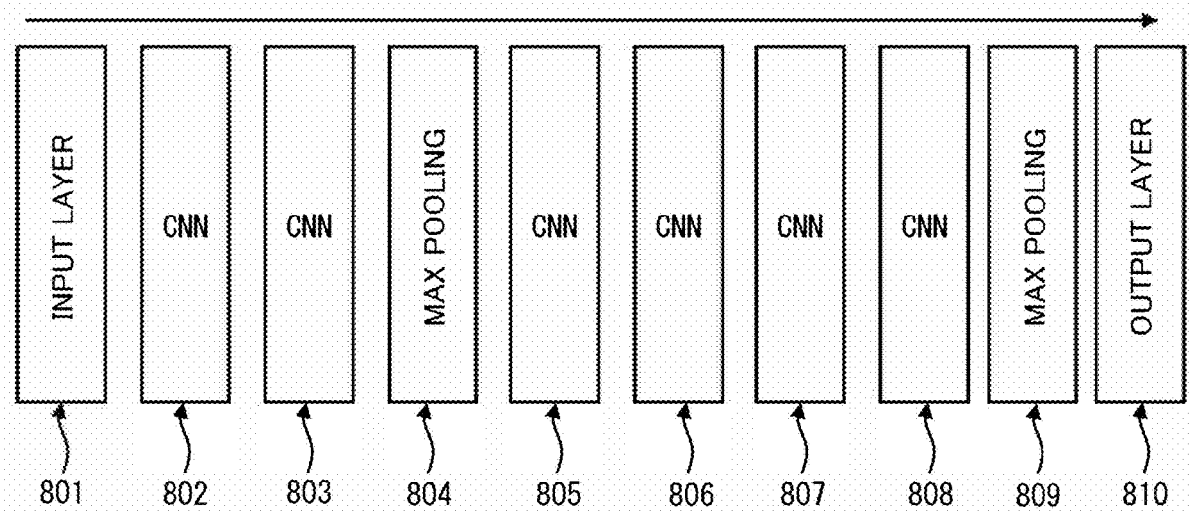

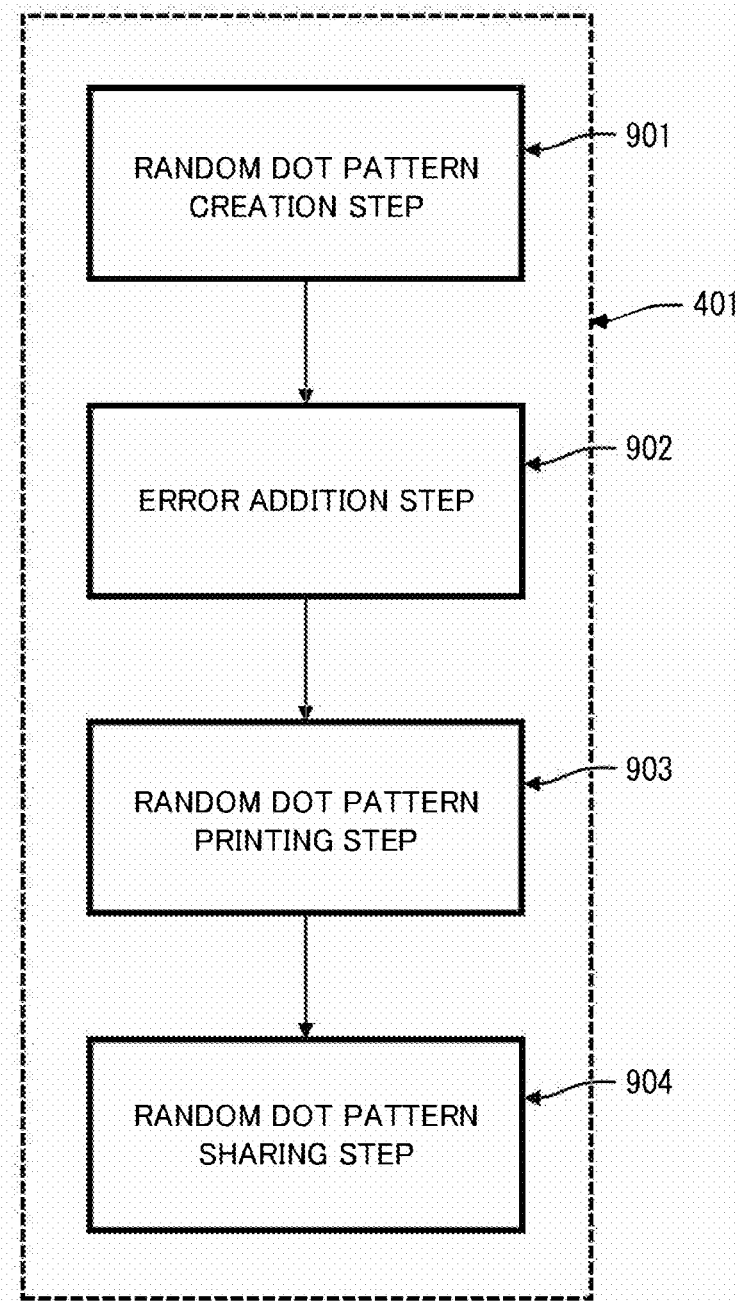

INKJET PRINTER SYSTEM

TECHNICAL FIELD

The present invention relates to an inkjet printer system. More specifically, the present invention relates to an inkjet printer system that is combined with a printing inspection device having a machine learning function.

BACKGROUND ART

In a typical inkjet printer of a continuous injection system charge control type that is used in a production factory and the like, an ink reservoir that reserves ink is provided in a main body, and the ink in the ink reservoir is supplied to a printing head by an ink supplying pump. The ink that is supplied to the printing head is continuously injected from an ink nozzle, and is formed into ink droplets.

Of the ink droplets, the ink droplet that is used for printing is subjected to charging and deflection processes, and is flied to the printing position of a desired printing target, whereas the ink droplet that is not used for the printing is not subjected to the charging and deflection processes, and is collected by a gutter to be returned to the ink reservoir by an ink collection pump.

Then, the inkjet printer is installed in the manufacturing line or the like of the production factory that manufactures a product, such as a packaged container accommodating food and a plastic bottle filled with a drink, and prints a best-by date, a manufacturing factory, a manufacturing number, and the like onto the surface of the product.

In addition, in the manufacturing line of the production factory, whether or not the printing by the inkjet printer is correctly performed may also be inspected, and for that, the manufacturing line into which an inkjet printer system that is combined with a printing inspection device is introduced is present.

The printing inspection device is a device that images the printing area of the product by an imaging device and determines "pass" or "failure" of the printing with respect to the image. The image of normal printing and the image of abnormal printing are previously registered to the printing inspection device, and the image and the imaged image are compared to perform the determination of "pass" or "failure".

And, it has recently been desired to further improve the inspection accuracy of a printed character. As a method for improving the inspection accuracy, a method by which machine learning is used is effective. As the method by which the machine learning is used for the printing inspection device of the inkjet printer, for example, a method described in Japanese Unexamined Patent Application Publication No. 2007-281723 (PTL 1) has been known.

PTL 1 describes the method by which color patches are printed according to a plurality of test ink amount sets, the color patches are image inputted by a scanner, and the machine learning is performed by using, as a teacher signal, a data set in which the test ink amount set is associated with a granularity index obtained by the analysis of the image data. In this way, typically, providing the machine learning function in the printing inspection device is often performed.

CITATION LIST

Patent Literature

PTL 1: Japanese Unexamined Patent Application Publication No. 2007-281723

SUMMARY OF INVENTION

Technical Problem

As described above, improving the inspection accuracy by using the machine learning is an effective method. However, in the inkjet printer of the continuous injection system charge control type, many types of characters and symbols including the Japanese language (hereinafter, representatively referred to as characters) are printed onto the printing target. Consequently, it is difficult to individually learn all the characters. In addition, when like the best-by date and the manufacturing number, different characters are printed onto respective printing targets, the characters to be inspected are changed for the respective printing targets. Due to this, a method for learning a fixed form character cannot be adopted, either. Therefore, the inkjet printer system that can increase the inspection accuracy to efficiently perform the inspection operation is required.

An object of the present invention is to provide a novel inkjet printer system that can, on the assumption of machine learning, increase the inspection accuracy of a printing inspection device to efficiently perform an inspection operation.

Solution to Problem

To solve the above problems, for example, the configurations described in the scope of claims are adopted. The present invention includes a plurality of means for solving the above problems, and when an example thereof is given, a printing inspection device includes a machine learning function unit by a neural network. The machine learning function unit includes a random test printing function unit that has a function that prints a dot arrangement pattern including a plurality of random dots that is based on various characters printed in the printing area of a printing target, and an evaluation function training function unit that has a function that optimizes the evaluation function of the neural network for inspecting a printed image on the basis of a printed image obtained by imaging the printed dot arrangement pattern.

Advantageous Effects of Invention

In the present invention, the dot arrangement pattern including the plurality of random dots that is based on various characters to be printed (random dot arrangement pattern) is test printed onto the printing target, and on the basis of this, the evaluation function of the neural network is optimized, so that the inspection accuracy can be increased to perform the efficient inspection operation.

BRIEF DESCRIPTION OF DRAWINGS

FIG. 4 is a flowchart illustrating the entire process of machine learning according to a first embodiment of the present invention;

FIG. 5 is a flowchart illustrating a data set creation test step illustrated in FIG. 4;

FIG. 6 is a flowchart illustrating a test printing step illustrated in FIG. 5;

FIG. 8 is a configuration diagram illustrating the configuration of a neural network used in the machine learning according to the embodiment of the present invention;

FIG. 9 is a flowchart illustrating a test printing step according to a second embodiment of the present invention.

DESCRIPTION OF EMBODIMENTS

Hereinafter, embodiments of the present invention will be described in detail with reference to the drawings, but the present invention is not limited to the following embodiments, and also includes, in its scope, various modification examples and application examples in the technical concept of the present invention.

First, the configuration and operation of a typical inkjet printer of a continuous injection system charge control type will be briefly described. It should be noted that the idea of the present invention is applicable, not only to the inkjet printer of the continuous injection system charge control type, which will be described below, but also to a typical office machine printer, as needed.

Figure 1:
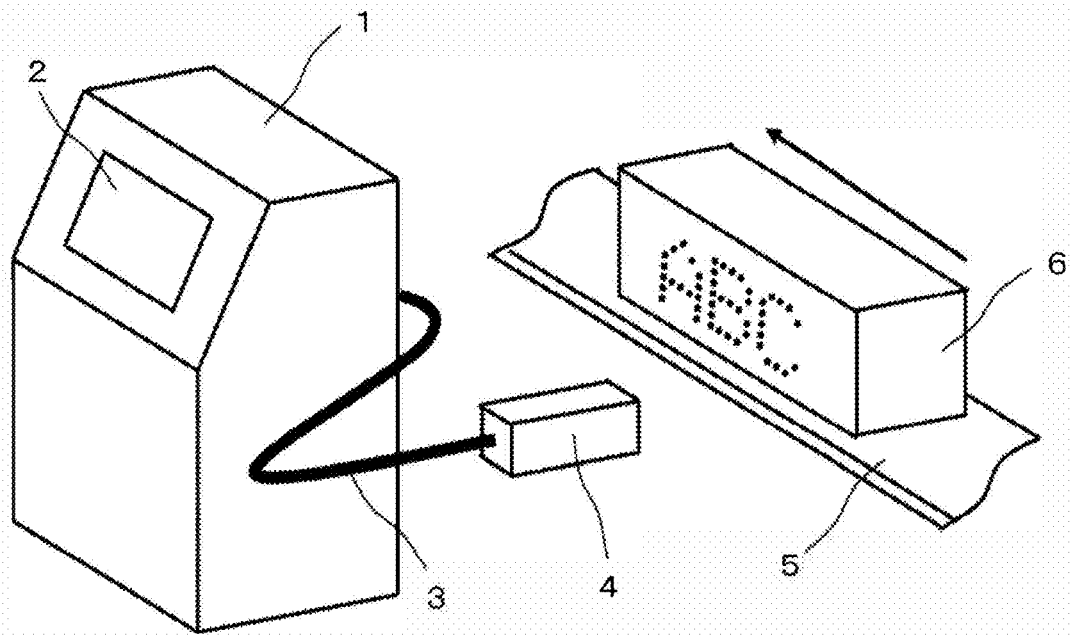
FIG. 1 is a schematic diagram explaining a printing method by an inkjet recording device.

FIG. 1 illustrates the appearance configuration of the inkjet printer. In FIG. 1, a main body 1 of the inkjet printer is provided with a display 2 for display. Ink is supplied to a printing head 4 through a cable 3, and in addition, decided printing contents are sent to the printing head 4 through the cable 3, so that on the basis of this, ink droplets are continuously injected, and are thus printed onto a printing target 6 that is conveyed by a conveying line 5, such as a belt conveyer.

Figure 2:
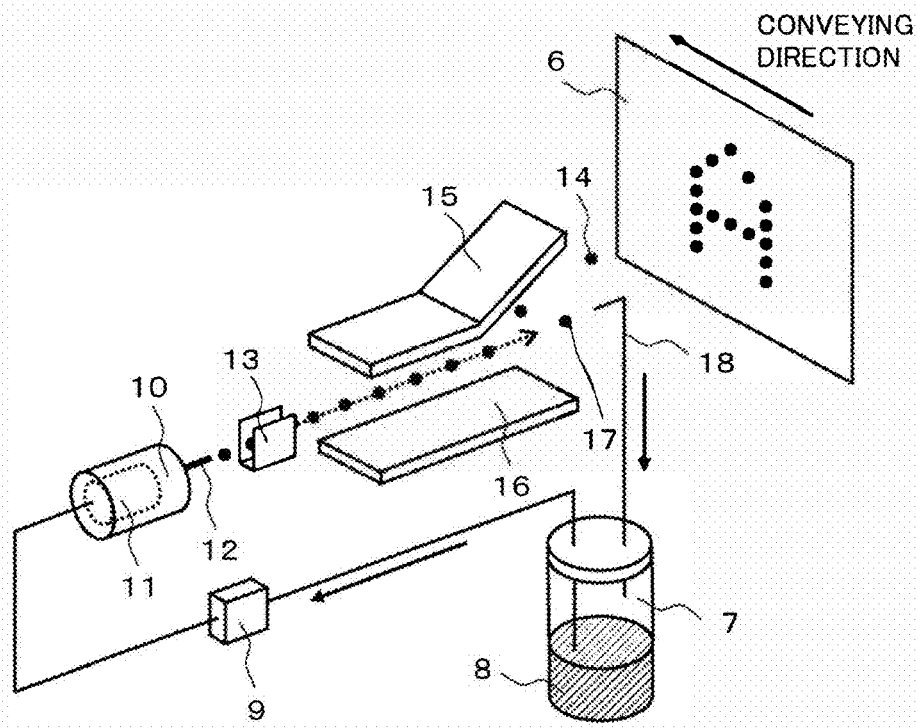
FIG. 2 is a configuration diagram explaining the printing principle of the inkjet recording device.

FIG. 2 schematically illustrates the configuration of the inkjet printer. In FIG. 2, an ink liquid 8 that is reserved in an ink reservoir 7 is pressurized by an ink supplying pump 9, and is supplied to an ink nozzle 10. A voltage is periodically applied to a piezoelectric device 11 that is installed in the ink nozzle 10, thereby exciting the ink in the ink nozzle 10. The excited ink is injected as an ink column 12 from the ink nozzle 10, and then becomes an ink droplet.

For the ink used for the printing, concurrently with the ink droplet formation, charging with respect to the ink droplet is performed by a charging electrode 13. A charged ink droplet 14 is deflected by an electric field that is generated in a deflection space between a deflection electrode positive pole 15 and a deflection electrode negative pole 16, and is then landed onto the printing target 6. In addition, an ink droplet 17 that is not used for the printing is not charged, and is not deflected, so that the ink droplet 17 is collected by a gutter 18.

It should be noted that the main body 1 of the inkjet printer of FIG. 1 accommodates the ink reservoir 7, the ink supplying pump 9, and the like illustrated in FIG. 2. In addition, the printing head 4 of FIG. 1 accommodates the ink nozzle 10, the charging electrode 13, the deflection electrode positive pole 15, the deflection electrode negative pole 16, the gutter 18, and the like illustrated in FIG. 2.

Embodiment 1

Figure 3:
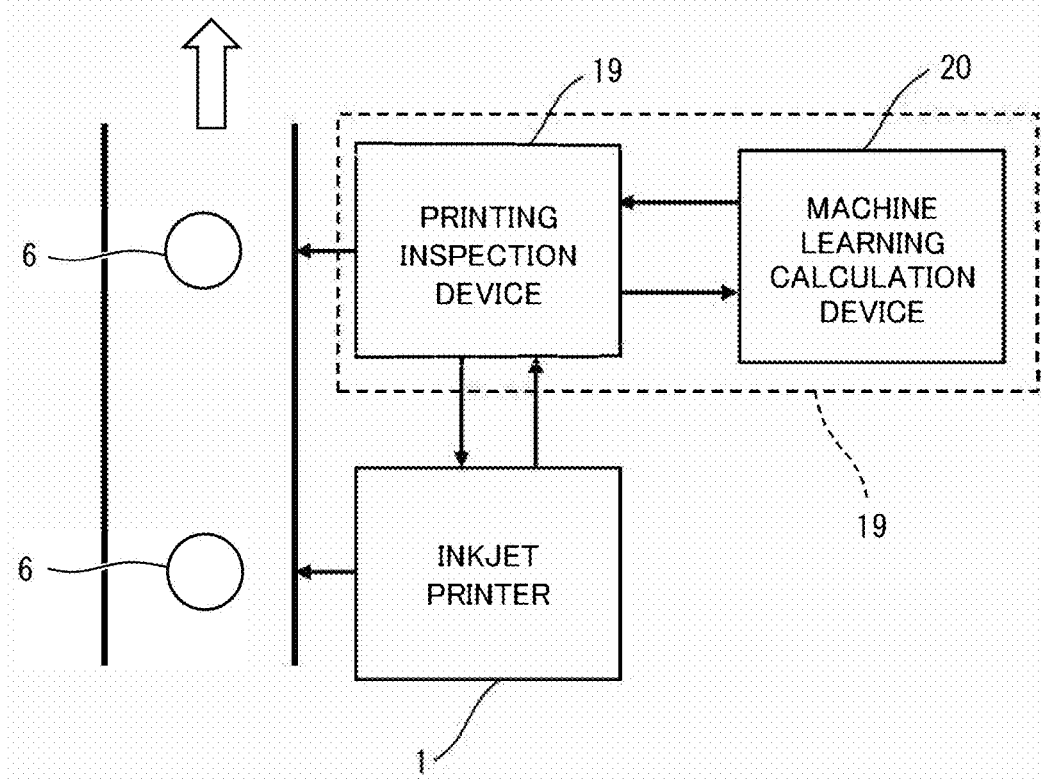
FIG. 3 is a schematic configuration diagram illustrating the outline of the entire configuration of an inkjet printer system.

Next, a first embodiment of the present invention will be described. FIG. 3 illustrates the configuration of an inkjet printer system including a machine learning function that configures the present embodiment, and to a printing inspection device 19, a machine learning calculation device is connected. Here, the printing inspection device 19 and the machine learning calculation device 20 are combined to be assumed as the printing inspection device 19. The configuration and operation of the machine learning calculation device 20 will be described in detail in the following embodiments. It should be noted that the machine learning calculation device 20 can also be integrated with the printing inspection device 19, as indicated by a dashed line.

In the present embodiment described below, the machine learning calculation device 20 and the printing inspection device 19 are integrated with each other. Then, the printing inspection device 19 and the inkjet printer 1 can transmit control information in both directions, and a dot arrangement pattern including a plurality of random dots for the training of machine learning is transmitted from the machine learning calculation device 20 to the inkjet printer 1.

The inkjet printer 1 performs test printing according to the transmitted dot arrangement pattern including the plurality of random dots, and images the printed dot arrangement pattern by an imaging device provided in the printing inspection device 19, so that the printed image is used for the machine learning.

The first embodiment of the present invention provides an inkjet printer system that includes a random test printing function unit that has a function that prints a dot arrangement pattern including a plurality of random dots that is based on various characters printed in the printing area of a printing target, and an evaluation function training function unit that has a function that optimizes the evaluation function of the neural network for inspecting a printed image on the basis of a printed image obtained by imaging the printed dot arrangement pattern. In particular, the present embodiment has a feature in the test image by the dot arrangement pattern including the plurality of random dots that is used in the machine learning.

FIG. 4 illustrates a flowchart of the entire processing process of an inspection operation by the machine learning of the printing inspection device. The machine learning itself is well known, but in the present embodiment, a convolution neural network (CNN) is used to perform the machine learning.

In the entire processing process of the inspection operation using the machine learning of the printing inspection device, first, in a data set creation test step 301, a teacher data set of the machine learning is created, and next, in a machine learning step 302, the teacher data set that is created in the data set creation test step 301 is used to perform the learning of the neural network for the inspection by an error back propagation method (back propagation), and then, in an application step 303, the neural network for the inspection that is created in the machine learning step 302 is used to perform the inspection operation of the actual printing.

Next, the random test printing function unit and the evaluation function training function unit that are the features of the present embodiment will be described. The random test printing function unit is the function in the data set creation test step 301, and the evaluation function training function unit is the function in the machine learning step 302.

FIG. 5 illustrates a flowchart of the data set creation test step 301. First, in a test printing step 401, the test printing is executed to the printing area of the printing target to be printed, by the inkjet printer 1 (see FIG. 3). Next, in a test print imaging step 402, the test print that is printed onto the printing target is imaged by using the printing inspection device 19 (see FIG. 3). Then, in a data set creation step 403, the teacher data set for the learning is created.

FIG. 6 illustrates a flowchart of the test printing step 401. First, in a random dot pattern obtaining step 501, a dot arrangement pattern including a plurality of predetermined dots is obtained. It should be noted that the dot arrangement pattern will be described later.

The dot arrangement pattern is represented by a dot matrix that forms one character. For example, in a dot matrix of 5 columns by 7 rows, one ink droplet is printed onto one of 35 grid squares, and forms a character to be required, by a collection of the ink droplets. Of course, when the ink droplet is printed onto the randomly selected grid square, the dot arrangement pattern including the plurality of random dots can be formed.

Here, the number of teacher data is decided according to the types of dot arrangement patterns. Consequently, as the number of dot arrangement patterns is larger, the accuracy of the later machine learning is improved, but according to that, time for spending for the test step is also increased. In the present embodiment, 100 types of dot arrangement patterns are prepared to execute the learning. The dot arrangement pattern to be obtained is a dot arrangement pattern including a plurality of dots in which dot presence/absence (dot disposition position) is randomly decided. Examples thereof are illustrated in FIGS. 7A to 7D.

Figure 7A:
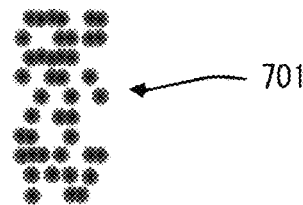
FIG. 7A is an explanatory view illustrating a normal random dot arrangement pattern that is a reference.

As illustrated in FIG. 7A, in a normal random dot arrangement pattern (normal dot arrangement pattern) 701, a plurality of dots are randomly disposed. However, each of the dots illustrated in FIG. 7A is present at the normal position. In addition, the percentage of the dot presence/absence (the dot percentage with respect to the entire total number of grid squares) of the normal dot arrangement pattern 701 can be freely set, but in the present embodiment, is set to 50%. That is, the plurality of dots are randomly present in half the total number of grid squares. In addition, the number of dots in the vertical or horizontal direction (column or row) is decided according to the character size to be printed, and in the present embodiment, 11 dots are present in each of both the vertical and horizontal directions.

Figure 7B:
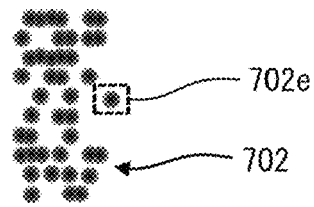
FIG. 7B is an explanatory view illustrating a first example of a random dot arrangement pattern in which a first error is intendedly given to the normal random dot arrangement pattern of FIG. 7A.
Figure 7C:
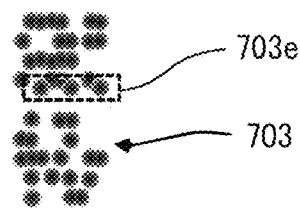
FIG. 7C is an explanatory view illustrating a second example of a random dot arrangement pattern in which a second error is intendedly given to the normal random dot arrangement pattern of FIG. 7A.
Figure 7D:
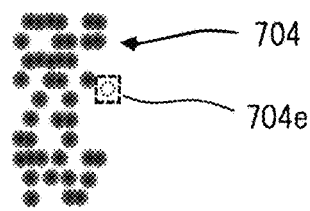
FIG. 7D is an explanatory view illustrating a third example of a random dot arrangement pattern in which a third error is intendedly given to the normal random dot arrangement pattern of FIG. 7A.

Further, for the dot arrangement pattern, an error dot arrangement pattern to which an error is intendedly added is also present. This becomes teacher data for determining "failure" in the inspection step. Typically, the inkjet printer has some characteristic "errors", and it is effective to add the "error" that simulates each of the characteristic errors. In the present embodiment, three types of error dot arrangement patterns are used together. FIGS. 7B to 7D illustrate the error dot arrangement patterns.

FIG. 7B is a dot misalignment error dot arrangement pattern 702. This is the error in which only a certain particular dot 702e that is enclosed by a dashed line square is printed at the slightly misaligned position. The size of the one dot misalignment becomes one-half or less of the distance between the dots. When the one dot misalignment is added, one dot is randomly selected to give misalignment from the normal dot arrangement pattern 701 by the randomly given distance and angle.

FIG. 7C is a row misalignment error dot arrangement pattern 703. This is the error in which one certain particular row 703e that is enclosed by a dashed line square is misaligned up and down. When the one row misalignment is added, one row is randomly selected to give misalignment from the normal dot arrangement pattern 701 up and down by the randomly given distance.

FIG. 7D is a dot missing error dot arrangement pattern 704. This is the error in which one certain particular dot 704e that is enclosed by a dashed line square is missed. When the dot missing is performed, one dot is randomly selected to delete the dot from the normal dot arrangement pattern 701.

Such three error dot arrangement patterns are previously added to the random dot arrangement pattern. That is, the normal dot arrangement pattern or one error dot arrangement pattern is given to one dot arrangement pattern, and this is prepared as a plurality of dot arrangement patterns. Therefore, in the present embodiment, 100 types of different dot arrangement patterns are obtained.

Returning to FIG. 6, in a random dot pattern printing step 502, this dot arrangement pattern is test printed onto the printing target. In this case, one dot arrangement pattern is assigned to one character to be actually printed. For example, when the characters to be actually printed are "ABC", three dot arrangement patterns are sequentially printed here.

Next, in FIG. 5, in the test print imaging step 402, the dot arrangement pattern that is test printed in the random dot pattern printing step 502 of FIG. 6 is imaged by the printing inspection device 19. Then, when the imaging is completed, the data set creation step 403 is executed.

In the data set creation step 403, the data set is created by using the imaged image. A label (correct information) is required to be added to each image for use as the data set. In the present embodiment, a binary label is used. This corresponds to "pass" or "failure" with respect to the printed dot arrangement pattern.

The label addition is performed by the previously prepared random dot arrangement pattern. For this, the same random dot arrangement pattern used when the inkjet printer performs the test printing is previously shared. Thus, the printing inspection device can associate the imaged image with the original random dot arrangement pattern.

The label with respect to the image is decided according to whether or not the "error" is added to the original dot arrangement pattern. When the "error" is not added, the label (correct information) of "pass" is given to the image, and when the "error" is added, the label (correct information) of "failure" is given to the image. Thus, the data set creation is enabled.

Next, returning to FIG. 4, the machine learning step 302 will be described in detail. Here, the neural network for the printing inspection is trained by using the data set that is created in the data set creation step 403 of FIG. 5. In the present embodiment, as described above, as the neural network, the machine learning is performed by using the convolution neutral network (CNN). FIG. 8 illustrates the convolution neutral network. The convolution neutral network has a well-known configuration.

First, an input image that is the imaged random dot arrangement pattern is compressed to an image having "32×32" dots in an input layer 801. The compressed image is a monochrome image having a white and black binary value per dot.

Subsequently, a CNN layer 802 is used. The input is "32×32×1", the filter has a size of "3×3×1", and three filters are used. The weight of the filter has a size of "long", and is initialized by an "He initial value". This is also the same for the following layers. In addition, the stride size is "1", the padding size is "1", and the output is "32×32×3". The stride and the padding are also the same for the following CNN layers. For an activation function, an Relu function is used, and this is also the same for the following CNN layers.

The third layer is also a CNN layer 803. The input is "32×32×3". The size of the filter is "3×3×3", and three filters are used. The output of these filters is "32×32×3".

The fourth layer is a Max Pooling layer 804. The size of the Pooling is "2×2", and the output is "16×16×3". After the Max Pooling layer 804, the same layers are provided.

The fifth layer is a CNN layer 805. The input is "16×16×3". The size of the filter is "3×3×3", and the output is "16×16×3". Likewise, a CNN layer 806 that is the sixth layer, a CNN layer 807 that is the seventh layer, and a CNN layer 808 that is the eighth layer are all the same as the CNN layer 805.

The ninth layer is a Max Pooling layer 809, the size of the Pooling is "2×2", and the output is "8×8×3". An output layer 810 that is the last layer is a fully-connected layer, and the output is binary. This corresponds to "pass" or "failure" of the inspection result.

Then, when the output result of the output layer 810 is different from the label (correct information), the training is executed by adjusting the weight and/or bias of the filter of the neural network by the error back propagation method (back propagation) so that the output result coincides with the label. Since the error back propagation method is used for the training and the number of data is "100", the batch size is "1", and the number of epochs is "100". As illustrated in FIG. 3, by using the data set, the training may be executed by the external machine learning calculation device 20, or may be executed by the printing inspection device 19 or the calculation device in the interior of the inkjet printer 1.

It should be noted that this training updates the weight and/or bias by using a loss function (a cross entropy error, a sum of squared error, or the like). Here, the weight and/or bias are/is the evaluation function for inspecting the printed image to be actually inspected, on the basis of the printed image obtained by imaging the printing result of the random dot arrangement pattern.

Next, in the application step 303 illustrated in FIG. 4, the inspection is executed by using the trained and created neural network. In this case, when the image of the printed character printed onto the printing target imaged by the printing inspection device 19 is inputted, the determination of "pass" or "failure" of the printed character is outputted by the trained neural network.

In this way, in the present embodiment, a printing inspection device includes a machine learning function unit by a neural network. The machine learning function unit includes a random test printing function unit that has a function that prints a dot arrangement pattern including a plurality of random dots that is based on various characters printed in the printing area of a printing target, and an evaluation function training function unit that has a function that optimizes the evaluation function of the neural network for inspecting a printed image on the basis of a printed image obtained by imaging the printed dot arrangement pattern.

According to this, the random dot arrangement pattern that is based on various characters to be printed is test printed onto the printing target, and on the basis of this, the evaluation function of the neural network is optimized, so that the inspection accuracy can be increased to perform the efficient inspection operation.

Embodiment 2

Next, a second embodiment of the present invention will be described. The present embodiment proposes a training method of the neural network that further increases the inspection accuracy, as compared with the first embodiment.

In the first embodiment, the previously prepared dot arrangement pattern is used, but with this, the number of dot arrangement patterns is finite, and in addition, the same dot arrangement pattern is required to be used every time. Thus, the present embodiment proposes a method by which when the training having the higher accuracy is further required, the test printing is performed while the random dot arrangement pattern is generated.

FIG. 9 illustrates a flowchart of the test printing step 401 illustrated in FIG. 5. In the present embodiment, the random dot arrangement pattern is dynamically created.

First, in a random dot pattern creation step 901, the dot presence/absence is randomly selected with respect to all the dots. The dot presence/absence probability can be freely decided, but in the present embodiment, is 50% like the first embodiment. As the method for randomly selecting the dot presence/absence, a pseudo random number is used. For example, a method for creating the pseudo random number by a Mersenne Twister method and the like is known.

Next, the error is added in an error addition step 902 with respect to the created dot arrangement pattern. The error addition probability is 50%, and the addition method of the error dot arrangement pattern is the same as the first embodiment, as illustrated in FIGS. 7B to 7D. When the dot arrangement pattern is decided, a random dot pattern printing step 903 prints the dot arrangement pattern like the first embodiment.

Next, a random dot pattern sharing step 904 shares the dot arrangement pattern with the printing inspection device 19. This is necessary for creating the data set. In addition, the error addition presence/absence is also shared at the same time. The following steps are the same as the first embodiment, but the number of test data can be freely decided. For example, when the accuracy of the network that is trained by 100 test data is insufficient, the test printing can be additionally performed.

In this way, according to the present embodiment, the training of the neural network that can further increase the inspection accuracy is enabled.

Embodiment 3

Next, a third embodiment of the present invention will be described. The present embodiment proposes a training method of the neural network that further increases the inspection accuracy, as compared with the first embodiment.

In the first embodiment, the efficiency of the learning with respect to the dot missing error may be insufficient. This is because the dot missing and the random dot presence/absence are not discriminated from each other.

Accordingly, in the data set creation step 403 of FIG. 5, created is combined dot arrangement pattern data 1001 in which the normal dot arrangement pattern 701 to which the dot error is not added, and the dot missing error dot arrangement pattern 704 are overlapped with each other.

Figure 10:
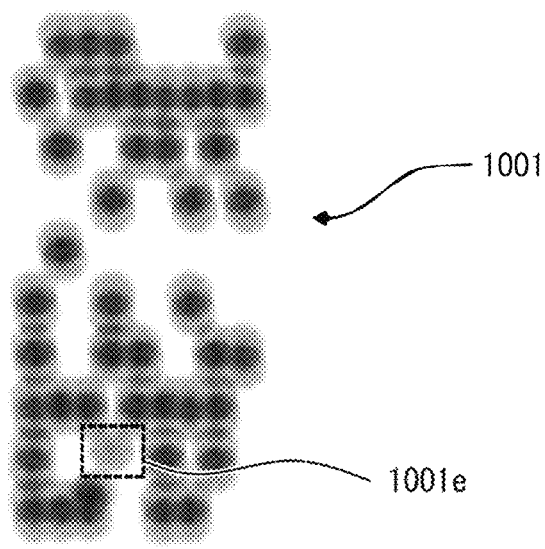
FIG. 10 is an explanatory view illustrating a dot arrangement pattern in which to learn dot missing, a dot missing pattern and a dot non-missing pattern are overlapped with each other, according to a third embodiment of the present invention.

FIG. 10 illustrates an example of the overlapped combined dot arrangement pattern data 1001, and by the overlapping, a dot 1001e in the missing portion that is enclosed by a dashed line square is emphasized, so that the neural network can be trained more efficiently.

In this way, according to the present embodiment, the training of the neural network that can further increase the inspection accuracy is enabled.

As described above, in the present invention, a printing inspection device includes a machine learning function unit by a neural network. The machine learning function unit includes a random test printing function unit that has a function that prints a dot arrangement pattern including a plurality of random dots that is based on various characters printed in the printing area of a printing target, and an evaluation function training function unit that has a function that optimizes the evaluation function of the neural network for inspecting a printed image on the basis of a printed image obtained by imaging the printed dot arrangement pattern.

According to this, the random dot arrangement pattern that is based on various characters to be printed (random dot arrangement pattern) is test printed onto the printing target, and on the basis of this, the evaluation function of the neural network is optimized, so that the inspection accuracy can be increased to perform the efficient inspection operation.

It should be noted that the present invention is not limited to some embodiments described above, and includes various modification examples. The above embodiments have been described in detail in order to simply describe the present invention, and are not necessarily required to include all the described configurations. In addition, part of the configuration of one embodiment can be replaced with the configurations of other embodiments, and the configuration of the one embodiment can also be added with the configurations of other embodiments. The configuration of each of the embodiments can also be subjected to addition, deletion, and replacement with respect to other configurations.

REFERENCE SIGNS LIST

1 . . . inkjet printer,
19 . . . printing inspection device,
20 . . . machine learning calculation device,
301 . . . data set creation test step,
302 . . . machine learning step,
303 . . . application step,
401 . . . test printing step,
402 . . . test print imaging step,
403 . . . data set creation step,
501 . . . random dot pattern obtaining step,
502 . . . random dot pattern printing step,
801 . . . input layer,
802, 803, 805-808 . . . CNN layer,
804, 809 . . . Max Pooling layer,
810 . . . output layer

The invention claimed is:

1. An inkjet printer system that comprises: an inkjet printer that performs printing onto a printing target; and a printing inspection device that images a printed character that is printed by the inkjet printer and performs the inspection of an imaged printed image,
wherein the printing inspection device includes a machine learner by a neural network, and
wherein the machine learner includes:
a random test printer that is configured to print a dot arrangement pattern including a plurality of random dots that is based on various characters printed in the printing area of the printing target; and
an evaluation function trainer that is configured to optimize the evaluation function of the neural network for inspecting the printed image on the basis of a printed image obtained by imaging the printed dot arrangement pattern,
wherein the random dot arrangement pattern includes a normal dot arrangement pattern in which a dot is present at a normal position and a dot missing error dot arrangement pattern in which one dot is randomly selected and the selected dot is deleted from a missing portion of the normal dot arrangement pattern, and
wherein the random test printer generates a combined dot arrangement pattern data in which the normal dot arrangement pattern and the dot missing error dot arrangement pattern are overlapped with each other such that the dot in the missing portion is emphasized and such that the neural network can be trained more efficiently.

2. The inkjet printer system according to claim 1, wherein the neural network is a convolution neural network.

3. The inkjet printer system according to claim 2, wherein the random test printer transmits the dot arrangement pattern to the inkjet printer, and wherein the inkjet printer executes test printing on the basis of the dot arrangement pattern.

4. The inkjet printer system according to claim 3, wherein the random dot arrangement pattern further includes an error dot arrangement pattern in which the dot is not present at the normal position.

5. The inkjet printer system according to claim 4, wherein the error dot arrangement pattern includes one or more of:
(1) a dot misalignment error dot arrangement pattern in which one dot is randomly selected and is misaligned from the normal dot arrangement pattern by a randomly given distance and angle; and
(2) a row misalignment error dot arrangement pattern in which one row is randomly selected and is misaligned from the normal dot arrangement pattern up and down by a randomly given distance.

6. The inkjet printer system according to claim 1, wherein the random test printer dynamically generates the dot arrangement pattern.

7. The inkjet printer system according to claim 6, wherein to dynamically generate the dot arrangement pattern, the dot arrangement pattern is generated by using a pseudo random number.

* * * * *